June 1, 1937.  P. A. WHITE  2,082,434
LICENSE PLATE
Filed Oct. 22, 1936
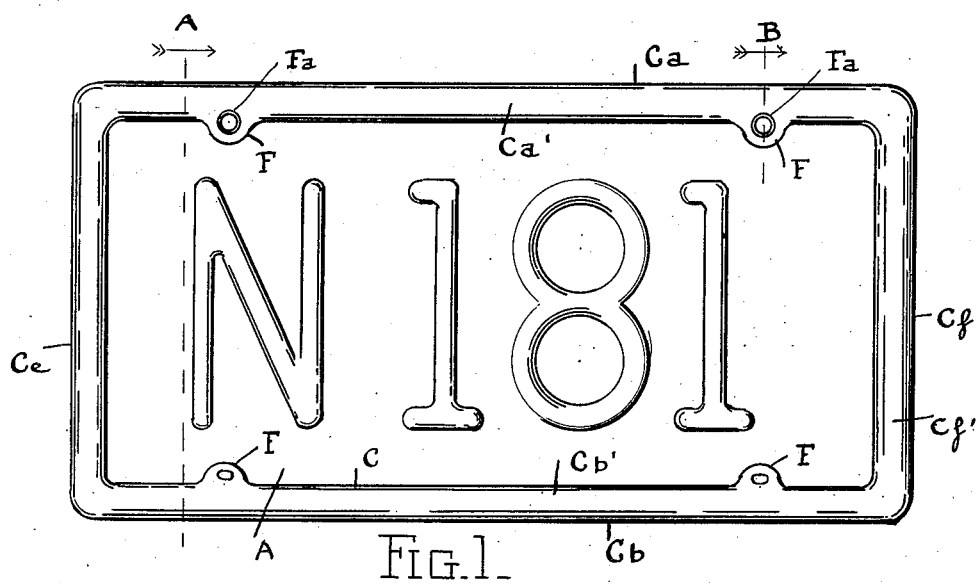
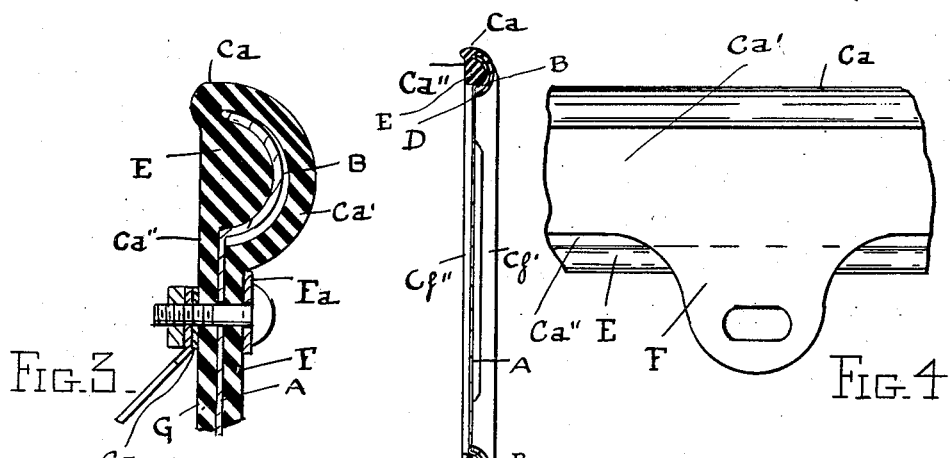
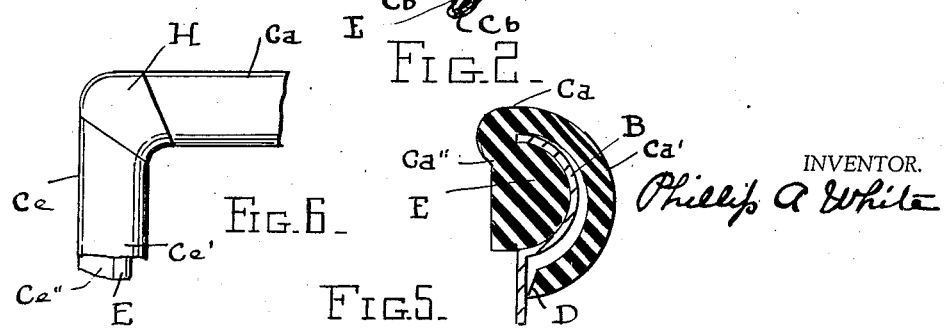
INVENTOR.
Phillip A. White

Patented June 1, 1937

2,082,434

UNITED STATES PATENT OFFICE 2,082,434

LICENSE PLATE

Phillip A. White, St. Albans, N. Y.

Application October 22, 1936, Serial No. 107,090

1 Claim. (Cl. 40—125)

This invention relates to improvements in license plate holders, and its leading object is to provide a holding frame of yielding rubber or similar material, for a standard vehicle license plate, which will protect the edges thereof and provide a non-rattling connection between the license plate and the supporting bracket of the vehicle.

Another object of the invention is to provide an elastic cushioning frame for license plates, which will interlock with the beaded edges of the license plate and grip the faces of the same to seal the same against flow of rain or other water over the plate.

With the above and other objects in view the invention consists in certain new and useful constructions, combinations, and arrangements of parts, clearly described in the following specification, and fully illustrated in the accompanying drawing, in which:—

Fig. 1 is a front elevation of the protecting frame applied to a license plate.

Fig. 2 is a vertical sectional view, taken on line A of Fig. 1, looking in the direction of the arrows.

Fig. 3 is a detail vertical sectional view, taken on line B of Fig. 1, looking in the direction of the arrows.

Fig. 4 is a fragmentary side elevation, on an enlarged scale.

Fig. 5 is a detail sectional view on an enlarged scale.

Fig. 6 is another fragmentary side elevation, showing a reinforced corner construction.

Referring to the accompanying drawing, illustrating the practical construction of the invention A designates a license plate of the type that is conventionally carried by automobiles and other road vehicles. These plates are usually constructed with a bead B, which is parallel to the edges of the plate, and which forms an integral border for the plate, the body of which is usually embossed to display the license number.

In common practice these plates are carried by the forward and rear ends of the automobile or other road vehicle, upon suitable brackets or supporting devices, by means of bolts extended through the bolt openings formed in the plates. The body of the plates usually depend from the connecting bolts and supporting brackets or other devices, and are free to develop considerable vibration.

The road movements of the vehicle and the wind movements which develop around the license plates cause them to rattle, and to transmit to the body of the vehicle various disturbing noises and vibrations.

The exposed edges of the license plates present sharp or jagged surfaces which frequently injure the hands or bodies of persons working around automobiles, trucks or other vehicles.

My invention is embodied in a protecting frame C, formed of elastic or yielding rubber, which is of a shape corresponding to that of the license plate, so as to provide horizontal bars $Ca$ and $Cb$, and vertical end bars $Ce$ and $Cf$, united together in a one-piece molding to provide a rectangular or other form.

The horizontal frame bars $Ca$ and $Cb$ are each formed with front wings $Ca'$ and $Cb'$, and the vertical bars $Ce$ and $Cf$ are each formed with front wings $Ce'$ and $Cf'$. The front wings of the horizontal bars are integrally connected to the back wings $Ca''$ and $Cb''$, and the front wings of the vertical bars are integrally connected to the back wings $Ce''$ and $Cf''$.

The front wings of all the bars are arcuate in cross section, so as to overlie the reinforcing bead B of the license plate, and to provide a sealing edge D, which is shown to be slightly bevelled, so as to have snug sealing engagement with the front side of the license plate. The rear or back wings of all of the bars are constructed slightly narrower than the front wings, and are preferably formed with an integral bead E, which snugly fits in the groove side of the bead B, so that the protecting frame is fully interlocked with the beaded edge of the license plate.

The front wing of the upper horizontal bar is formed with integral lugs F, which carry metal washers $Fa$, and the rear wing of the upper horizontal bar is formed with similar lugs G, which carry metal washers $Ga$. These lugs are located on the upper horizontal bar to register with the usual bolt holes of the license plate, and are formed with elongated bolt holes for this purpose.

The front wings of the frame bars are wider in all cases than the corresponding rear wings, and the frame is molded so that the sealing edge D of the front wings will spring under the back wings, so as to develop tension against the front side of the license plate when the protective frame is stretched over the marginal edge of the license plate. In order to insure a snug fit between the protective frame and the license plate, the protective frame is molded slightly smaller than the license plate.

The corner portion of the protective frame may be reinforced by triangular integral raised portions H, as shown in Fig. 5.

The connecting bolts pass directly through the lugs of the protective frame, and the rubber is subjected to the compressive action developed when the bolts are tightened in place on the usual supporting brackets or rods. In this way the license plate is insulated from the metal body of the automobile or other road vehicle, by means of the yielding rubber of which the lugs are formed. This rubber is displaced by the clamping of the license plate and the protective frame on the supporting bracket, so that a constant tension is maintained on the connecting bolts, which tends to prevent the bolts working loose.

This improved connection thus serves to tightly secure the license plate in position, and to prevent rattling of the license plate on the body.

The protective frame encloses the entire marginal edge portion of the license plate, by bars of cushioning material, which will prevent a person from being injured when he or she is forced against the license plate.

The protective frame may be manufactured in colors and in various designs, so as to form a decorative border for the license plate.

Having described my invention I claim:

A protective and rattle preventing frame for license plates, consisting of a frame of molded elastic rubber providing horizontal and connecting vertical bars, each of the bars having an arcuate front wing and a back wing shorter than the front wing, the arcuate front wing having a bevelled sealing edge adapted to engage the front side of a license plate, and the back wing having an integral bead adapted to fit in the groove of a marginal bead of a license plate.

PHILLIP A. WHITE.